United States Patent [19]
Kim

[11] Patent Number: 5,625,573
[45] Date of Patent: Apr. 29, 1997

[54] FAST ACQUISITION OF GMSK-MODULATED SIGNAL FOR CDPD APPLICATIONS

[75] Inventor: In-Kyung Kim, N. Potomac, Md.

[73] Assignee: Hughes Electronics, Los Angeles, Calif.

[21] Appl. No.: 396,916

[22] Filed: Mar. 1, 1995

[51] Int. Cl.$^6$ .................................................. H04L 27/06
[52] U.S. Cl. ................................... 364/514 R; 375/344
[58] Field of Search .................. 364/514 R; 375/344, 375/354, 362–370; 370/100.1–108; 455/255, 257, 263, 265

[56] References Cited

U.S. PATENT DOCUMENTS

| | | | |
|---|---|---|---|
| 4,621,365 | 11/1986 | Chiu | 375/1 |
| 5,151,925 | 9/1992 | Gelin et al. | 375/82 |
| 5,276,706 | 1/1994 | Critchlow | 375/13 |
| 5,343,497 | 8/1994 | Canosi et al. | 375/111 |
| 5,390,216 | 2/1995 | Bilitza et al. | 375/106 |
| 5,428,647 | 6/1995 | Rasky et al. | 375/366 |
| 5,440,589 | 8/1995 | Kaku et al. | 375/344 |
| 5,444,697 | 8/1995 | Leung et al. | 370/19 |
| 5,511,098 | 4/1996 | Gardner | 375/340 |

Primary Examiner—James F. Trammell
Attorney, Agent, or Firm—John T. Whelan; Wanda Denson-Low

[57] ABSTRACT

A method and apparatus for the fast acquisition of GMSK-modulated signal for CDPD (Cellular Digital Packet Data) applications wherein the frequency offset and time of arrival of the data sequence are quickly determined. The computational burden is reduced by roughly estimating the frequency offset using an operation insensitive to timing uncertainty and roughly estimating the time of arrival using an operation insensitive to frequency offset using the roughly estimated frequency offset and time of arrival to construct a small two dimensional array to determine the final frequency offset and time of arrival.

19 Claims, 6 Drawing Sheets

FAST ACQUISITION OF GMSK-MODULATED SIGNAL FOR CDPD APPLICATIONS

BACKGROUND OF THE INVENTION

Existing cellular network systems have enjoyed great popularity in recent years. At various times, the channels that carry the voice communications of the cellular system may be idle (i.e. no signal transmission over the channel at a particular time). These unused or idle voice channels may be utilized for other communication such as data communication. In particular, an overlay system network utilizing unused or idle voice channels for digital data communication is desirable. Cellular Digital Packet Data (CDPD) is such an overlay system which provides mobile datagram service utilizing the structure of existing cellular telephone networks. The CDPD system allows digital data transmission over idle channels of an already existing cellular system. A consortium of cellular communication carriers prepared and released in 1993 a specification entitled "Cellular Digital Packet Data System Specification."

The specification defines a protocol to be used by the industry for transmitting and receiving data messages over an existing cellular communication system. The protocol specifies the format of the data message. More particularly, the data message has a preamble formed by a dotting sequence of 38 bits in length followed by a synchronization pattern of 22 bits in length. Following the preamble is the data sequence comprised of n multiples of 385 bits of data. The dotting sequence is an alternating series of 1's and 0's. The synchronization pattern has the following bit pattern 1011 1011 0101 1001 1100 00.

The CDPD overlay system utilizes the facilities of the existing cellular system to transmit data. In particular, a plurality of remote subscriber units communicate with other remote subscriber units through base stations. The data communication from the remote subscriber units to the base stations is wireless.

Several variable factors are introduced into the signals transmitted from a remote subscriber unit to the base unit which, if not correctly compensated for, may lead to incorrect demodulation of the data signal by the base station. One variable factor is the frequency offset of the transmitted signal. Frequency offset is introduced by several factors. Each remote subscriber unit utilizes a crystal oscillator to provide the proper carrier frequency on which the data signal is transmitted, however, the accuracy of the crystal oscillator from one remote subscriber unit to the next may vary thereby introducing an unknown frequency offset in the transmitted signal. In addition, because the remote subscriber units are often used in conjunction with moving objects such as automobiles, a doppler frequency shift is introduced in the transmitted signal which is dependent upon the speed of the moving object. In addition, the time of arrival of the data sequence is dependent upon the distance the remote subscriber unit is from the base station.

Figure 1:
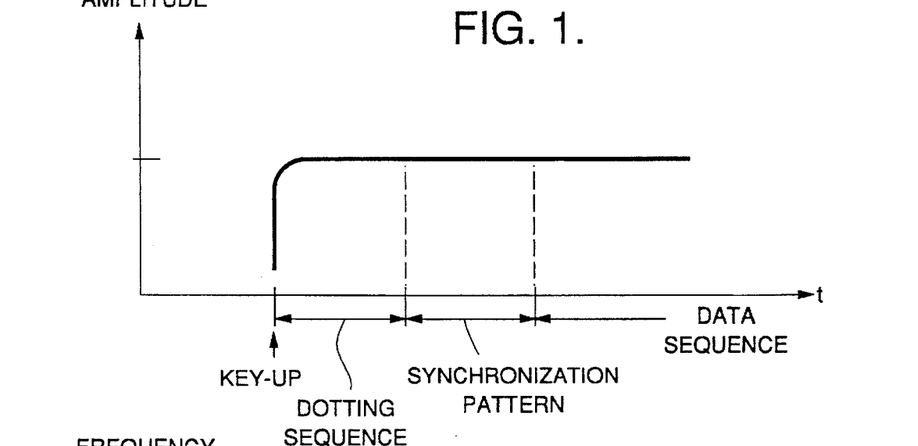
FIG. 1 illustrates the signal amplitude profile of a transmitted signal.
Figure 2:
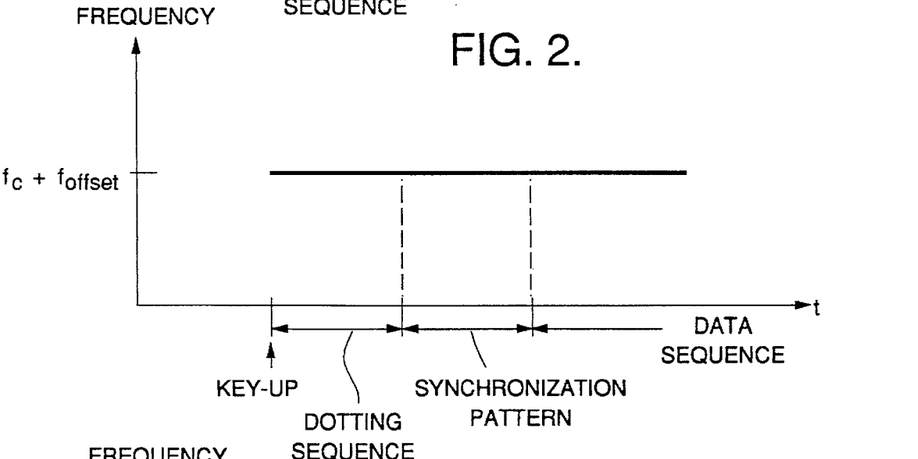
FIG. 2 illustrates the carrier frequency profile for a transmitted signal under ideal conditions.
Figure 3:
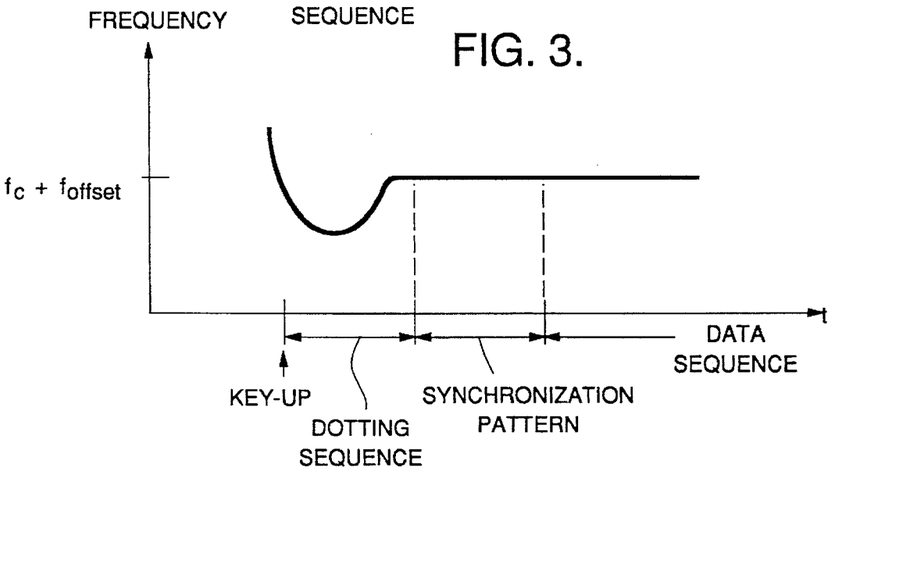
FIG. 3 illustrates the carrier frequency profile for a typical transmitted signal from a remote subscriber unit in the CDPD system.

The transmitted signal also suffers from an additional impairment which is called frequency drift. The frequency drift during the beginning of the transmitted signal is known as "load pull" or "key-up transient." This key-up transient severely degrades the signal quality often introducing more than 3 KHz frequency drifts during the dotting sequence which makes it almost impossible to estimate reliably the frequency offset using the dotting sequence. FIG. 1 illustrate the signal amplitude profile and FIG. 2 illustrates the carrier frequency profile for a transmitted signal under ideal conditions, i.e., within a specified frequency offset tolerance. FIG. 3 illustrates the carrier frequency profile for a typical transmittal signal from a remote subscriber unit in the CDPD system. As can be seen from the carrier frequency profile in FIG. 3, the frequency offset during the dotting sequence varies greatly and is typically outside of the specified tolerance. Thus, in such a case, the synchronization pattern may be used to estimate the frequency offset. This, however, involves an unacceptable acquisition delay for a CDPD demodulator implemented on a low cost digital signal processor because of the computational burden involved. The frequency offset $f_{offset}$ of FIGS. 2 and 3 refers to a steady state frequency offset.

Thus, in order for the base station to properly demodulate a signal transmitted by a remote subscriber unit, the base station must estimate the frequency offset introduced in the transmitted signal as well as estimate the time of arrival of the data sequence. The frequency offset and time of arrival may be referred to as data acquisition parameters.

Figure 4:
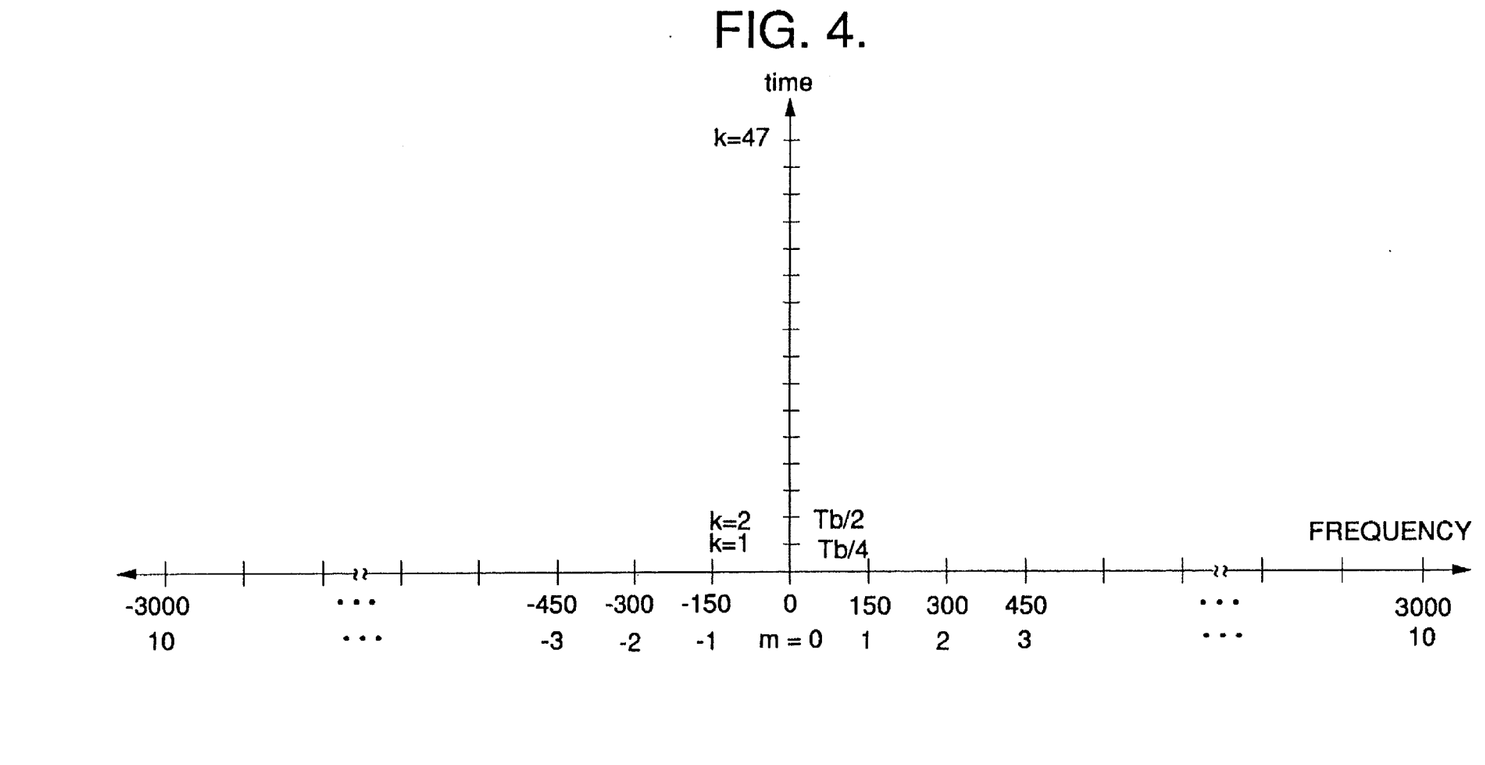
FIG. 4 is a graph illustrating a two-dimensional search array.

One method of estimating frequency offset and time of arrival is to perform a correlation of the received signal with the synchronization pattern, frequency and time shifted according to frequency offset and timing resolution tolerances. More particularly, equation (1) below describes the correlation that may be used to estimate frequency offset and time of arrival.

$$c(\tau_k, f_m) = \int r(t-\tau_k) \cdot S^*(t) e^{-j2\pi f_m t} dt, \text{ where} \quad (1)$$

$$k=0, \ldots 47$$

$$m=0, \ldots 20$$

and r(t) is the received signal, $S^*(t)$ is the complex conjugate of the synchronization pattern, $\tau_k$ is the estimated time of arrival and $f_m$ is the estimated frequency offset. The variables k and m have been chosen for the CDPD system which allows ±3 KHz frequency offset and up to 12 bits of timing uncertainty. Within these tolerances, if one wanted to resolve the frequency offset to a 150 Hz accuracy (21 frequency bins, i.e., m=0, . . . 20) and timing up to one eighth of bit time (48 time bins, i.e., k=0, . . . 47), 960 correlation computations must be performed. More particularly, a two-dimensional array as shown in FIG. 4 would need to be searched.

Equation (1) can be rewritten in a sampled version format as equation (2) below:

$$c(\tau_k, f_m) = \sum_n r(nT_s + \tau_k) S_k^*(nT_s) e^{-j2\pi f_m nT_s} \quad (2)$$

where $T_s$ is the sampling rate. As is well known to those of ordinary skill in the art, $\tau_k$ and $f_m$ are scanning parameters which are adjusted to reveal the relatedness or correlation between the functions.

Equation (1) or (2) is solved to find the values $\tau_k$ and $f_m$ which maximize equation (3) below.

$$\max_{k,m} |C(\tau_k, f_m)|^2 \quad (3)$$

Thus as shown in FIG. 4 a two dimensional time-frequency search is performed where a matrix of 21 frequency bins and 48 time bins need to be searched to estimate the frequency offset $f_m$ and time of arrival $\tau_k$. Such a search is computationally burdensome which presents a problem for real-time systems. In addition, because of the number of computations involved, more expensive digital signal processing circuitry must be used.

An object of the present invention is to reduce the computational burden in acquiring data acquisition parameters of a CDPD signal which has significant impairment due to the "key up transient" previously described. It is another object of the present invention to allow the data acquisition parameters, in particular frequency offset and time of arrival, to be acquired quickly so that the system will operate efficiently in a real-time environment. In addition, the present invention to reduce the number of computations performed so that less expensive digital signal processors may be used thereby reducing the cost of the overall system.

SUMMARY OF THE INVENTION

The invention itself, together with further objects and attendant advantages, will best be understood by reference to the following detailed description, taken in conjunction with the accompanying drawings.

DETAILED DESCRIPTION OF THE DRAWINGS

Figure 5:
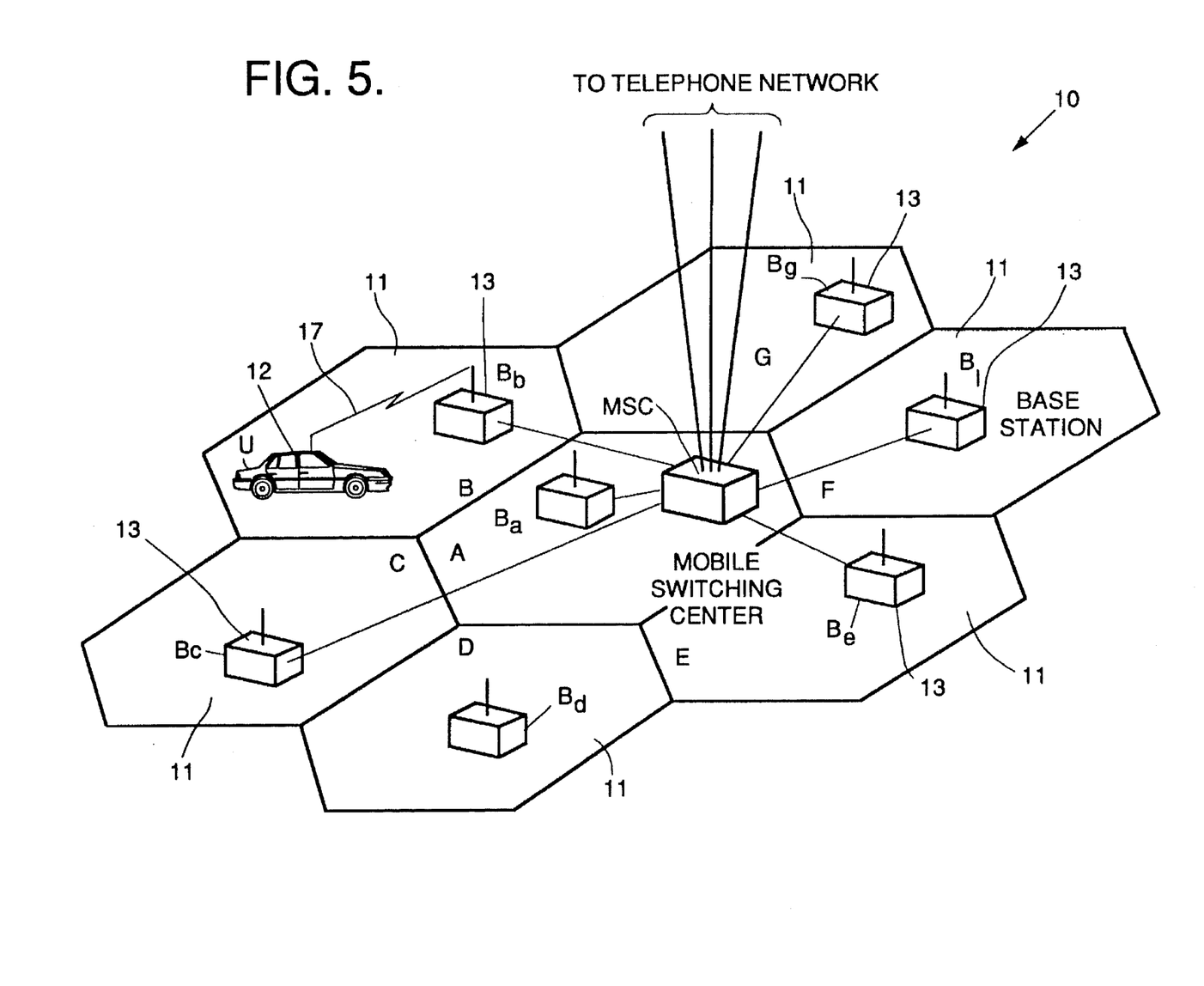
FIG. 5 is a general block diagram of the CDPD overlay system and its relation to remote subscriber units used in the underlying cellular communication system.

FIG. 5 is a general block diagram of the CDPD overlay system 10 and its relation to remote subscriber units 12 used in the underlying cellular communication system. In a simplified description which is intended for illustrative purposes only, the existing cellular network communication system includes a plurality of remote subscriber units 12 (only one of which is illustrated). Geographical areas are divided into cells 11 and within each cell 11 is a base station 13 that transmits and receives signals from the remote subscriber units 12. The remote subscriber units 12 communicate with other remote subscriber units that may be mobile or stationary through base stations 13. The data communication between remote subscriber units 12 and the base station 13 is wireless (i.e., occurs over air link 17). As already discussed, because the remote subscriber units 12 are often located in moving objects such as automobiles as illustrated, uncertainties, most particularly frequency offset and variable times of arrival of the data information, are introduced in the signal transmitted by the remote subscriber units 12. Also, the transmitted signal from the remote subscriber unit is often impaired due to the "key up transient." The base station 13 must estimate these data acquisition parameters before the received signal can be properly demodulated.

Figure 6:
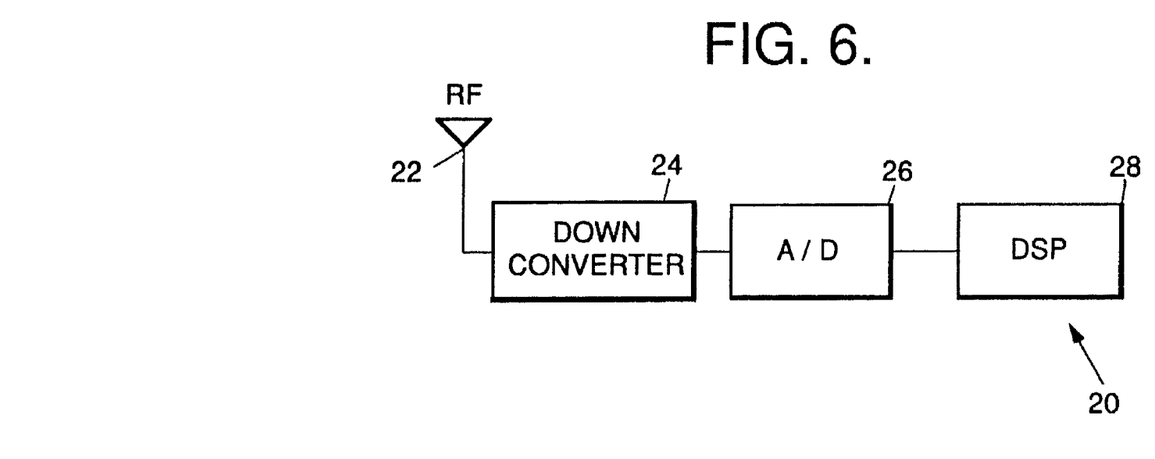
FIG. 6 is a block diagram of a portion of the receiver of the base station.

FIG. 6 is a block diagram of a portion of the receiver 20 of the base station. The receiver 20 includes an antenna 22, a down converter 24, an analog-to-digital (A/D) converter 26 and a digital signal processor (DSP) 28. The antenna 22 receives the signal transmitted by a remote subscriber unit. The received signal can be defined by equation (4) below:

$$r(t) = A e^{j[2\pi f_c t + \Theta(t) + 2\pi f_d t]}, \tag{4}$$

where $f_c$ is the carrier frequency, $f_d$ is the frequency offset introduced in the transmitted signal and $\Theta(t)$ is the data modulated onto the carrier frequency. The frequency offset $f_d$ includes two main components, a doppler frequency shift which is dependent upon the speed at which the remote subscriber unit is traveling plus a frequency offset created by inaccuracies in the crystal oscillator of the remote subscriber unit as previously described.

The down converter 24 strips away the carrier frequency $f_c$ to create a so-called base band signal. The signal out of the down converter can be defined by equation (5) below:

$$r(t) = A e^{j[\Theta(t) + 2\pi f_d t]}. \tag{5}$$

Next the signal is passed through the A/D converter 26 where it is sampled at a rate 4×24.3 KHz. The signal out of the A/D converter 26 can be represented by equation (6) below:

$$r(k) = A e^{j[\Theta(kT_s) + 2\pi f_d k T_s]}, \text{ where} \tag{6}$$

$$k = 0, 1, 2 \ldots \text{ and}$$

$$T_s = \text{sampling interval} = \frac{1}{(4 \times 24300)} = 10.288 \, \mu\text{sec}.$$

Next the signal is passed to the digital signal processor (DSP) 28. In a preferred embodiment, a Texas Instrument C51 family DSP is used. The DSP 28 performs two major functions. First, the data acquisition parameters, i.e., frequency offset and time of arrival of the data information, are estimated and then the received signal is demodulated using these data acquisition parameters. In a preferred embodiment, the DSP 28 converts the sampling rate of the A/D converter 26 to a sampling rate of 4·19.2 KHz. All of the signal processing performed by DSP 28 are done with samples at the 4·19.2 KHz rate. Each bit is 1/19.2 KHz in duration and thus 4 samples per bit are taken.

In particular, DSP 28 has a memory device which is often called a data buffer. The digitized samples are stored in this memory sequentially and the DSP 28 performs signal processing on these stored samples. More particularly, as the preamble is received, the DSP 28 stores these bits in memory and performs the following steps using the information it has stored.

Figure 7:
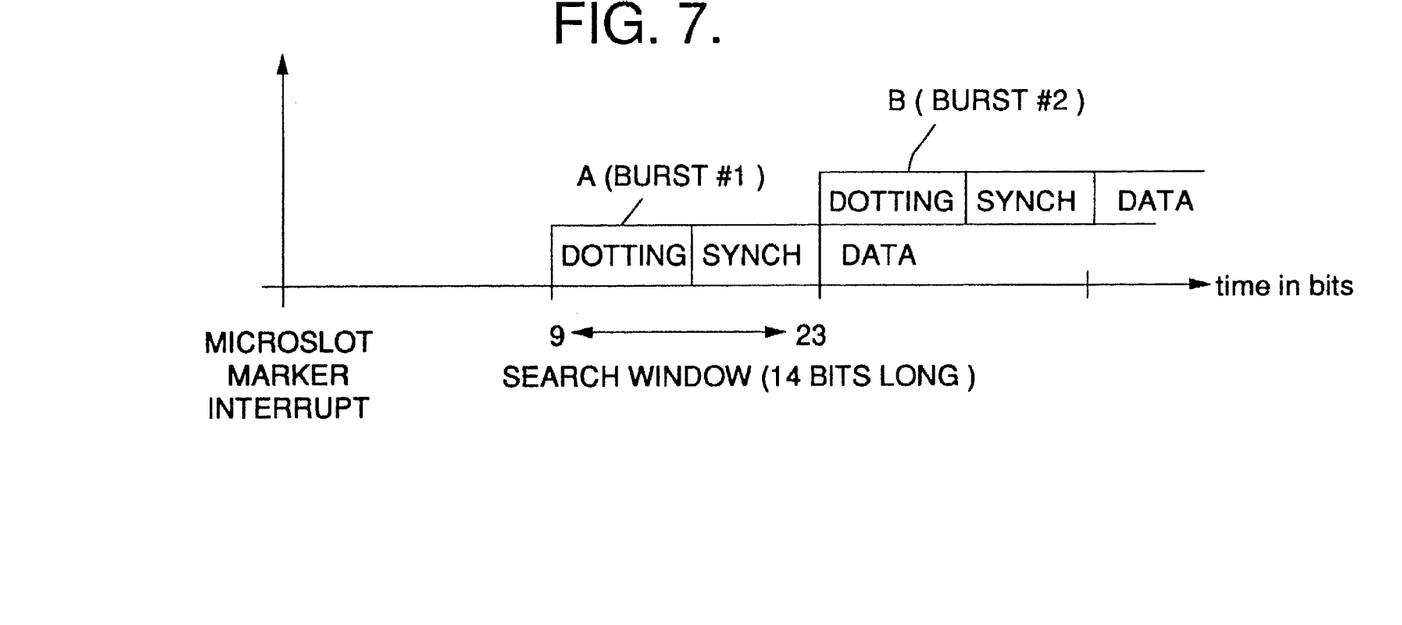
FIG. 7 is a graph illustrating two extreme arrival lines at the transmitted signal.

In order to understand how DSP 28 processes the received signal, however, background regarding the CDPD packet transmission protocol is necessary. Both the base station and the remote subscriber unit have synchronous microslot markers ticking every 3.125 msec, i.e. 60 bits apart. The remote subscriber unit is only allowed to transmit its burst of data information, including the preamble, during a time window of 0 to 8 bits after a microslot marker and only if the microslot is designated as idle, i.e., the base station receiver (MDBS) is not currently demodulating a signal from another mobile unit. The receiver 20 of the base station gets the microslot timing through an interrupt. The microslot interrupt is generated by the transmitter of the MDBS and delivered to the receiver of the MDBS, and, more particularly, the microslot marker is delivered to the receiver DSP through "interrupt" by the transmitter DSP (not shown). Because of hardware delays and the mechanism of creating the microslot markers for the base station receiver, the DSP 28 expects to receive the transmitted signal from the remote subscriber unit during bits 9–23 after the microslot marker. FIG. 7 graphically illustrates the range of times of the arrival of the transmitted signal. At one extreme, the earliest time the transmitted signal could be received by receiver 20 is at bit 9 as represented by curve A. This will be referred to as burst #1. The latest the receiver 20 expects to receive the transmitted signal is at bit 23. Curve B will be referred to as burst #2.

At each microslot marker, DSP 28 can be in one of two states. It may be in a detection state where it performs its detection and acquisition operations or it may be in its demodulation state where it tries to demodulate multiples of 385 bits of data. As previously described, the present invention is primarily concerned with the operation of DSP 28 in its detection state. DSP 28 in its detection state initializes the memory buffer (not shown) upon reception of the microslot marker interrupt and begins storing samples received from the A/D converter 26 into memory. The contents of the memory buffer will appear as shown in FIG. 7 and thus the sample in the buffer can be indexed using bit number. Thus, the buffer contents for bits 0–8 are always samples from noise since the transmitted signal has not yet arrived in that time interval. DSP 28 in its detection state assumes the presence of a transmitted signal and processes the received signal as will be described below in detail. If the maximum defined by equation (8) below does not exceed a precalculated threshold, the DSP 28 decides that no transmission has occurred and enters the detection state at the next microslot marker interrupt. Otherwise, it continues to acquire the acquisition parameters.

Figure 8A:
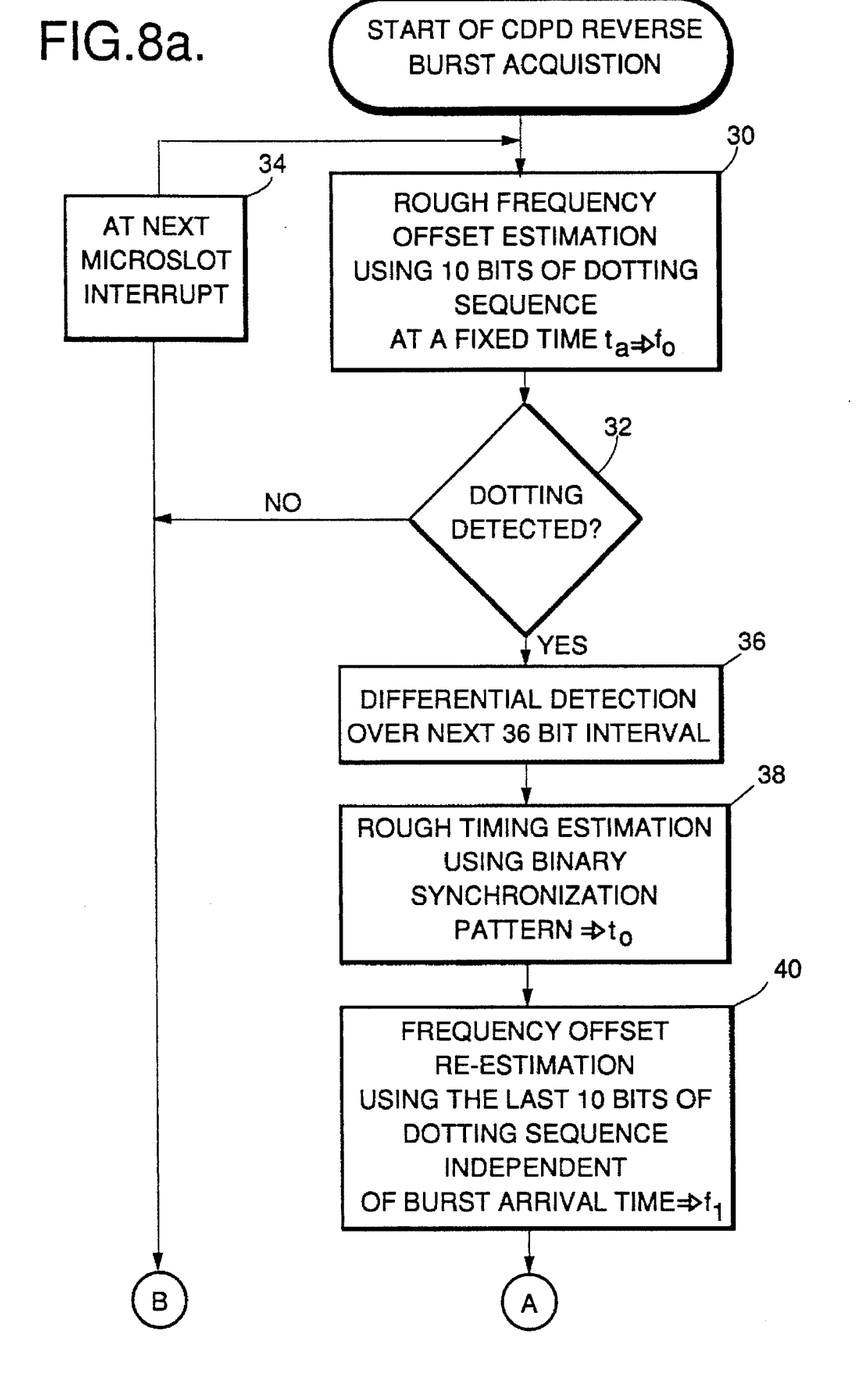
FIGS. 8a and b is a flow chart illustrating the various steps performed by the digital signal processor of the present invention.
Figure 8B:
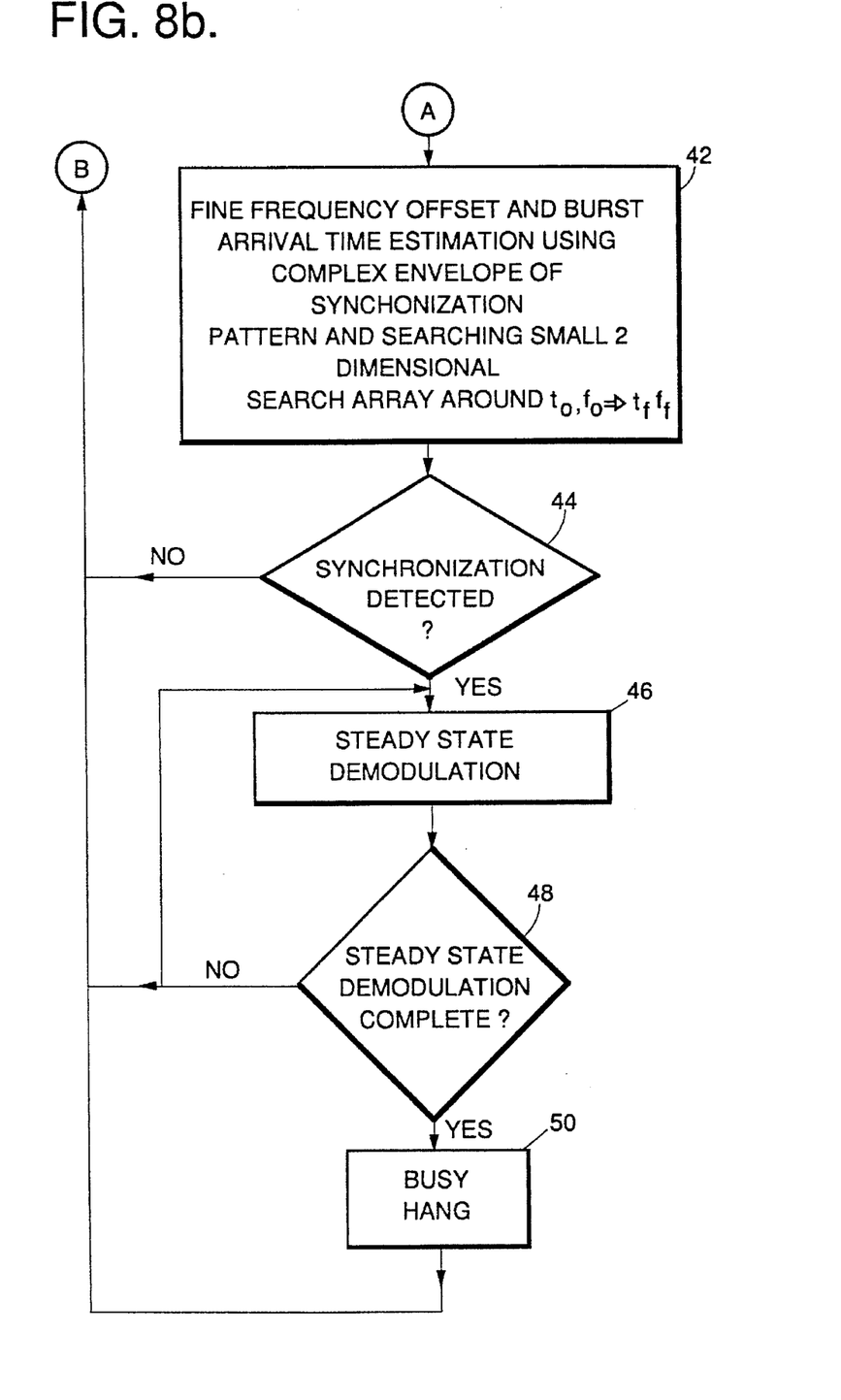

Reference will now be made to the flow chart shown in FIGS. 8A and b. The first step performed by the DSP 28 shown in block 30 is to roughly estimate the frequency offset using samples in the buffer represented by indices 38 through 47 in bits, i.e. 10 bits of the dotting sequence. Note the samples represent the last 10 bits of dotting sequence bit number 29 through 38 for the earliest possible arrival (burst #1) and a middle portion, bit number 15 through 24 of the dotting sequence for the latest arrival (burst #2). The frequency resolution is selected at 600 Hz thus, within the ±3 KHz frequency offset tolerance specified for the CDPD system, eleven frequency bins are created, each bin separated from the next by 600 Hz. To roughly estimate the frequency offset, a fixed time of arrival $t_a$ is chosen to ensure that a valid portion of the dotting sequence as described above is used taking into account all possible arrival delays. Using the latter portion of the dotting sequence is desirable because it is less affected by key-up transient. The received signal delayed by $t_a$, which represent the fixed portion of the buffer as described above is correlated with the 10 bit long dotting sequence, frequency shifted by the resolution selected in this step. The 10 bit long dotting sequence is the complex envelope of CDPD signal modulated by the bit pattern: 1010101010. Equation (7) below describes the correlation performed:

$$c(t_a, f_m) = \sum_{n=0}^{10N-1} r(t_a + nT_s) \cdot S^*(nT_s) e^{-j2\pi f_m nT_s}, \quad (7)$$

where $m = 0, \pm 1, \ldots \pm 5$, and where $T_s$ is the sampling interval, N is the number of samples per bit, $T_s = T_b/N$, where $T_b =$ bit interval $= 1/19200 = 52.0833$ μsec; $r(t)$ is the received signal and $S^*(t)$ is the complex conjugate of the signal representing the dotting sequence. Equation (7) is solved to find the $f_m$ that maximizes equation (8) below:

$$\max_m |C(t_a, f_m)|^2 \quad (8)$$

The $f_m$ that maximizes equation (8) will be referred to as the estimated frequency $f_o$. The estimated frequency $f_o$ is stored in memory. In this first step, only eleven (11) correlation computations are performed.

Next at block 32 it is determined whether the maximum defined by equation (8) exceeds a predetermined threshold. If it does, the next step defined by block 36 is carried out. If it does not, DSP 28 decides that no transmission has occurred and enters the detection state at the next microslot marker interrupt as shown in block 34.

Thus, in essence, by performing the operations defined by equations (7) and (8), the frequency offset is roughly estimated using the dotting sequence of the preamble. Since the dotting sequence is periodic in time, the correlation value defined by equation (7) is insensitive to timing error, i.e., the correlation degradation due to the bit time misalignment for the correlation computation is small for all time alignment errors. This allows the use of a single fixed time $t_a$ for the correlation of equation (7) to roughly estimate the frequency offset. The only constraints in selecting $t_a$ are as mentioned before. More specifically, to ensure that the dotting sequence is used for the range of possible arrival times considered, i.e., 14 bits (bits 9–23) (see FIG. 7) to compute the correlation of equation (7). Also, to use the latter portion of the dotting sequence of the received signal as much as possible since the received signal becomes more reliable further away from the beginning of the dotting sequence because the key-up transient dies out eventually. Thus, $t_a$ is selected to use the last 10 bits of dotting sequence for the earliest possible arrival time, i.e., burst #1. Therefore, $t_a$ is representing 47 bits in time (i.e., $t_a = 47T_b$) from the beginning of the microslot interrupt.

The next step defined by block 36 is to estimate the time of arrival. The frequency offset estimate $f_o$ is not reliable enough for bit time synchronization because, even though the latter portion of the dotting sequence is used, that portion of the dotting sequence might still have significant key-up transient. Also, to roughly estimate the frequency offset $f_o$, the frequency resolution bins are coarsely set at 600 Hz. For 600 Hz frequency resolution, the 10 bit long correlation of equation (7) provides sufficient performance. In addition, since the key-up transient is dying out, the frequency offset during the synchronization pattern which is important for fine timing estimation, may be different from the frequency offset for the dotting sequence of the received signal. Thus, a rough frequency offset estimation has been made at the beginning of the search window and the frequency offset may be changing during the search window but will be settling down during the synchronization pattern of the received signal.

To estimate burst arrival time roughly in bit time resolution, a detection scheme which is insensitive to frequency offset must be used. Since the CDPD signal is GMSK (Gaussian Minimum Shift Keying) modulated, a differential detection scheme may be used since GMSK is inherently differentially modulated. The binary synchronization pattern of 22 bits is used to extract 1, 0 patterns from the received signal using the differential detection scheme to estimate the burst arrival time. By the time this operation is to be performed the memory of DSP 28 has now stored the entire dotting sequence and synchronization pattern of the received signal. Since the 22 bits of binary synchronization pattern are used to compute correlation in equation (10) below and the search window is 14 bits long, the differential detection must be performed on a 36 bit interval on the received signal. The starting point should represent the start of the synchronization pattern for the earliest possible arrival burst (burst #1), i.e., bit 47 in the receive buffer. The differential detection is performed for 4 samples per bit interval. One bit differential detection using the time of arrival $t_a$ defined above can be described by equation (9) as follows:

$$D(t) = Imag\{r(t_a+t)conjg[r(t_a+t-T_b)e^{j2\pi f_o T_b}]\}, \text{ where} \quad (9)$$

$$t=0, \ldots 4 \times 36 (36 \text{ bit interval})$$

$$t_a = 47 T_b$$

where $T_b = 1/19200$ is the bit duration of the CDPD signal and r(t) is the received signal. $D(t)=1$ if sign $(D(t)) \geq 0$ otherwise $D(t)=0$. Then using the 22 bits of synchronization pattern stored in memory and the signal $D(t)$ derived by equation (9) which is also stored in memory, the time of arrival is estimated in block 38 by correlating $D(t)$ with the synchronization pattern defined as $S(n)$ where $S(n) \in \{0,1\}$ Equation (10) defines the operation performed.

$$P(t) = \sum_{n=0}^{22-1} D(t+4n) \oplus S(n), \text{ where} \quad (10)$$

where $$t=0, 1, 2, \ldots, 4 \times 14 \text{ (14 bit interval)}$$

$$s(n) = \{1011\ 1011\ 0101\ 1001\ 1100\ 00\}$$

where $\oplus$ denotes the Exclusive-Or operation and $P(t)$ is evaluated during a 14 bit interval. Since a 14 bit long search window exists and 4 correlations per bit time are evaluated, $P(t)$ is evaluated for $t=0, \ldots, 4 \times 14$ (i.e. differential detection is performed 4 samples per bit time). Packet arrival time estimation $t_o$ is the time index which yields the maximum $P(t)$, as defined by equation (11) below:

$$t_o = \max P(t) \quad 0 \leq t \leq 4 \times 14 \quad (11)$$

The steps of determining $D(t)$ and $P(t)$ may be pipe-lined by constructing a two-dimensional array for the synchronization pattern to reduce processing delay. Also, to improve performance, two maxima may be selected. In particular, two times of arrival which yield two maxima of $P(t)$ are selected, i.e., after finding $t_o$, find $t_o'$ such that $$t_o' = \max P(t)$$

$$0 \leq t \leq 4 \times 14$$

$$t_o' \neq t_o$$

Next, in block 40 the frequency offset is reestimated using the last 10 bits of the dotting sequence. Equation (7) described above can be used replacing $t_a$ with $47T_b + t_o \cdot T_s - 10T_b$. The frequency bins are set up at frequencies $f_o$, $f_o \pm 600$ Hz, $f_o \pm 1200$ Hz and $f_1$ is the frequency among then which gives the maximum correlation value.

Finally, in block 42 the frequency offset and time of arrival estimations are refined by searching a small two dimensional array around $t_o$ and $f_1$. The search bins are set at $t_o$, $t_o \pm T_b/4$, $t_o \pm T_b/2$ and $f_1$, $f_1 \pm 300$ Hz, $f_1 \pm 600$ Hz. At each bin, the received signal r(t) is correlated with the complex envelope of the synchronization pattern which is a baseband representation of the modulated signal of the synchronization pattern. Thus, at a particular time and frequency bin, $t_s$ and $f_s$, the following correlation is performed as defined by equation (12) below:

$$R(t_s, f_s) = \sum_{n=0}^{22N-1} r(47T_b + t_o T_s + nT_s) \cdot \quad (12)$$

$$conjg[C(n)\exp(j2\pi f_s n T_s)]$$

where $C(n) = C(t)|_{t=nT_s}$ where $C(n)$ denotes the samples of the complex envelope of the synchronization pattern $C(t)$, N is the number of samples per bit and $T_s = T_b/N$.

In a preferred embodiment, the two complex multiplications of equation (12) can be reduced by constructing a two dimensional array table by combining $C(n)$ and the complex exponential. The final estimation of frequency offset and time of arrival, i.e., $f_f$ and $t_f$ is the set that maximizes the value $|R(t_s, f_s)|^2$. The computation of $|R(t_s, f_s)|^2$ is the critical step that generates the most time delay, however, because only 25 search bins are involved, a considerable reduction in computation is achieved compared to the 960 computations previously described.

Next, at block 44 it is determined whether the maximum defined by $|R(t_s, f_s)|^2$ exceeds a predetermined threshold. If it does, the next step defined by block 46 is carried out. If it does not, DSP 28 decides that no transmission has occurred and enters the detection state at the next microslot marker interrupt as shown in block 34.

Also, because the frequency offset estimation $f_f$ is determined using not only the dotting sequence of the preamble but also the synchronization pattern, it is more reliable than if the dotting sequence were used alone, which may not always be reliable.

At block 46 DSP 28 demodulates the received signal using the frequency offset $f_f$ and time of arrival $t_f$ previously determined. Thus, DSP 28 can now properly demodulate the received signal. At block 48, it is determined whether the demodulation is complete. If it is not, the steady state demodulation of block 46 continues. If the demodulation is complete, control is passed to block 50 which tells DSP 28 to wait until the remote subscriber unit turns off its carrier. When that happens, DSP 28 waits till the next microslot interrupt to enter its detection state.

If two maxima $t_o$ and $t_o'$ are selected, then the operations performed in blocks 40 and 42 are calculated at $t_o'$ as well as at $t_o$.

Of course, it should be understood that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A method of estimating frequency offset and time of arrival of a modulated signal received by a digital signal processor so that the modulated signal can be properly demodulated, the signal having a preamble including a dotting sequence and a synchronization pattern followed by a data sequence, the method comprising the steps of:

storing the preamble and data sequence in a memory of the digital signal processor;

determining a frequency offset $f_0$ by selecting a time of arrival $t_a$, correlating a portion of the dotting sequence stored in memory time shifted by the time of arrival $t_a$ with the complex conjugate of a portion of the dotting sequence stored in memory and selecting a maximum correlation value;

performing a differential detection on the received signal frequency and time shifted by the frequency offset $f_0$ and time of arrival $t_a$ respectively to create a differential detection sequence using the synchronization pattern stored in memory;

determining a time of arrival $t_o$ by correlating the differential detection sequence with the synchronization pattern stored in memory and selecting a maximum correlation value;

determining a new frequency offset $f_1$ by correlating a portion of the dotting sequence stored in memory time shifted by the time of arrival $t_o$ with the complex conjugate of a portion of the dotting sequence stored in memory and selecting a maximum correlation value;

determining a final frequency offset $f_f$ and time of arrival $t_f$ by correlating the received signal time shifted by the time of arrival $t_o$ with the complex conjugate of the envelope of the synchronization pattern and selecting maximum correlation values; and demodulating the received signal using the frequency offset $f_f$ and time of arrival $t_f$ previously determined.

2. A method according to claim 1 wherein the step of determining the frequency offset $f_o$ is performed by solving the following equation for $f_m$ that provides the maximum correlation value:

$$c(t_a, f_m) = \sum_{n=0}^{10N-1} r(t_a + nT_s) \cdot S^*(nT_s) e^{-j2\pi f_m nT_s},$$

where, $m = 0, \pm 1, \ldots, \pm 5$. $T_s$ is the sampling interval. N is the number of samples per bit. $T_s = T_b/N$, where $T_b =$ bit interval. r(t) is the received signal and $S^*(t)$ is the complex conjugate of the received signal.

3. A method according to claim 2 wherein the maximum correlation value must exceed a predetermine threshold value before the remaining steps of claim 1 are performed.

4. A method according to claim 1 wherein the step of determining the time of arrival $t_o$ is performed by solving the following equation for $t_o$ that provides a maximum correlation value:

$$P(t) = \sum_{n=0}^{22-1} D(t + 4n) \oplus S(n),$$

where $t = 0, 1, 2, \ldots, 4 \times 14$ bits interval, $s(n) = \{1011\ 1011\ 0101\ 1001\ 1100\ 00\}$, and where $\oplus$ denotes the Exclusive-Or operation.

5. A method according to claim 1 wherein the step of performing a differential detection is performed by solving the following equation:

$$D(t) = Imag\{r(t_a+t) conjg[r(t_a+t-T_b) e^{j2\pi f_o T_b}]\},$$

where $t = 0, \ldots, 4 \times 36$ (36 bit interval), $t_a = 47T_b$, $T_b = 1/19200$ is the bit duration of the received signal and r(t) is the received signal and where $D(t) = 1$ if sign $(D(t)) \geq 0$ otherwise $D(t) = 0$.

6. A method according to claim 1 wherein the step of determining a new frequency offset $f_1$ is performed by solving the equation set forth in claim 2 when $t_o = 47T_b + t_o^* T_s - 10 T_b$.

7. A method according to claim 1 wherein the step of determining the final frequency offset $f_f$ and time of arrival $t_f$ is performed by solving the following equation for the maximum correlation values:

$$R(t_s, f_s) = \sum_{n=0}^{22N-1} r(47T_b + t_o T_s + nT_s) \cdot congj[C(n) \exp(j2\pi f_s nT_s)],$$

where $C(n) = C(t)|_{t=nTs}$, where $C(n)$ denotes the samples of the complex envelope of the synchronization pattern $C(t)$. N is the number of samples per bit and $T_s = T_b/N$.

8. A method according to claim 1 further comprising the step of determining a second time of arrival $t_o'$ by correlating the differential detection sequence with the synchronization pattern stored in memory and selecting a second maximum correlation value.

9. Apparatus for providing an estimated frequency offset and time of arrival of a modulated signal received by a digital signal processor so that the modulated signal can be properly demodulated, the signal having a preamble including a dotting sequence and a synchronization pattern followed by a data sequence, the apparatus comprising:

detection means responsive to the received signal;

control means and a memory coupled to the detection means, said control means being responsive to the received signal to store in said memory the received signal including the preamble; and computing means coupled to said memory and programmed so as to (a) determine a frequency offset $f_o$ by selecting a time of arrival $t_a$, correlating a portion of the dotting sequence stored in memory time shifted by the time of arrival $t_a$ with the complex conjugate of a portion of the dotting sequence stored in memory and selecting a maximum correlation value;

(b) perform a differential detection on the received signal frequency and time shifted by the frequency offset $f_0$ and time of arrival $t_a$ respectively to create a differential detection sequence using the synchronization pattern stored in memory;

(c) determine a time of arrival $t_o$ by correlating the differential detection sequence with the synchronization pattern stored in memory and selecting a maximum correlation value;

(d) determine a new frequency offset $f_1$ by correlating a portion of the dotting sequence stored in memory time shifted by the time of arrival $t_o$ with the complex conjugate of a portion of the dotting sequence stored in memory and selecting a maximum correlation value;

(e) determine a final frequency offset $f_f$ and time of arrival $t_f$ by correlating the received signal time shifted by the time of arrival $t_o$ with the complex conjugate of the conjugate of the envelope of the synchronization pattern and selecting maximum correlation values; and (f) demodulate the received signal using the frequency offset $f_f$ and time of arrival $t_f$ previously determined.

10. Apparatus according to claim 9 wherein the dotting sequence is 38 bits in length and the synchronization pattern is 22 bits in length.

11. Apparatus according to claim 9 wherein the modulated signal is Gaussian Minimum Shift Keying modulated.

12. A method of estimating frequency offset and time of arrival of a received modulated signal so that the modulated signal can be properly demodulated, the signal having a preamble including a dotting sequence and a synchronization pattern followed by a data sequence, the method comprising the steps of:

storing the preamble and data sequence;

determining a frequency offset $f_0$;

performing a differential detection on the received signal frequency to create a differential detection sequence;

determining a time of arrival $t_o$ and selecting a maximum correlation value;

determining a new frequency offset $f_1$ and selecting a maximum correlation value;

determining a final frequency offset $f_f$ and selecting maximum correlation values; and demodulating the received signal using the frequency offset $f_f$ and time of arrival $t_f$ previously determined.

13. The method of claim 12 wherein the step of determining a frequency offset $f_0$ comprises selecting a time of arrival $t_a$, correlating a portion of the stored dotting sequence time shifted by the time of arrival $t_a$ with the complex conjugate of a portion of the stored dotting sequence and selecting a maximum correlation value.

14. A method according to claim 12 wherein the maximum correlation value selected in association with the step of selecting a time of arrival $t_a$ must exceed a predetermined threshold value before any further time of arrival or frequency offsets are determined.

15. The method of claim 12 wherein the step of performing a differential detection comprises performing a differential detection on the received signal frequency time shifted by the frequency offset $f_0$ and time of arrival $t_a$ respectively to create a differential detection sequence using the synchronization pattern stored in memory.

16. The method of claim 12 wherein the step of determining a time of arrival $t_o$ comprises determining a time of arrival $t_o$ by correlating the differential detection sequence with the stored synchronization pattern.

17. The method of claim 12 wherein the step of determining a new frequency offset $f_1$ comprises determining a new frequency offset $f_1$ by correlating a portion of the stored dotting sequence time shifted by the time of arrival $t_o$ with the complex conjugate of a portion of the stored dotting sequence.

18. The method of claim 12 wherein the step of determining a final frequency offset $f_f$ and time of arrival $t_f$ comprises determining a final frequency offset $f_f$ and time of arrival $t_f$ by correlating the received signal time shifted by the time of arrival $t_o$ with the complex conjugate of the envelope of the synchronization pattern.

19. A method according to claim 12 further comprising the step of determining a second time of arrival $t_o'$ by correlating the differential detection sequence with the synchronization pattern stored in memory and selecting a second maximum correlation value.

* * * * *